Oct. 23, 1951   W. A. BEDFORD JR   2,572,588
BLIND ASSEMBLY NUT
Filed Feb. 20, 1947
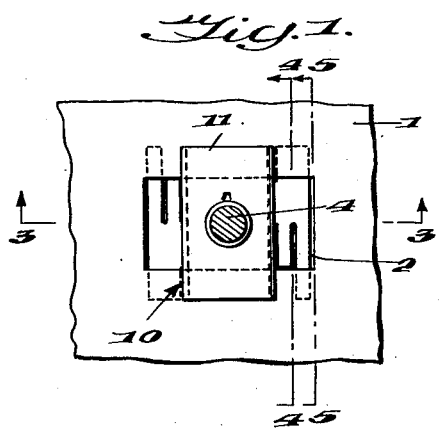
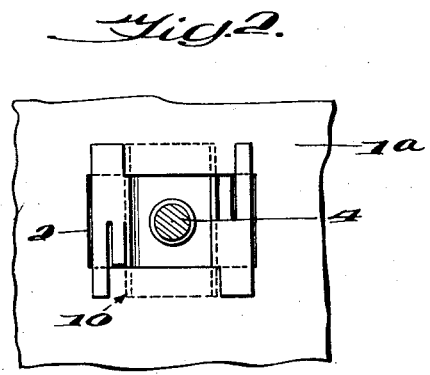
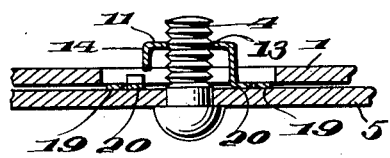
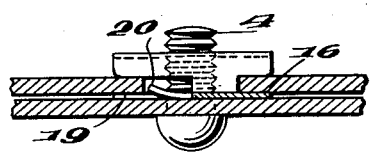
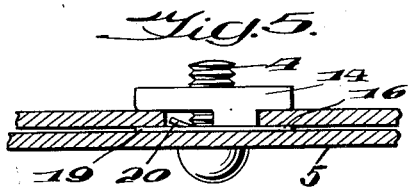
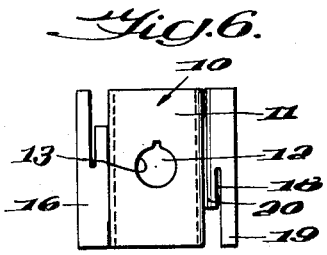
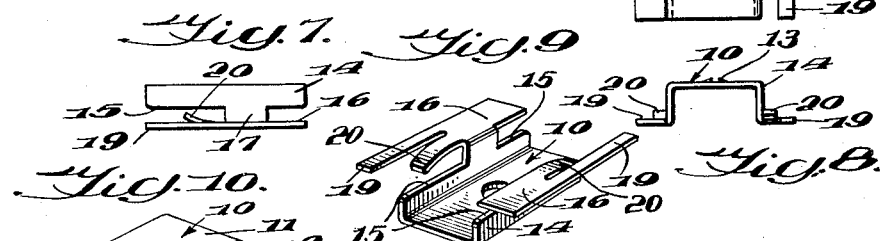
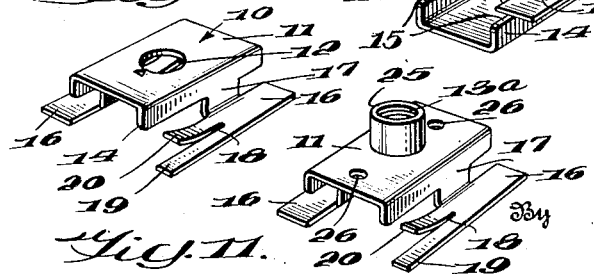
Inventor
WILLIAM A. BEDFORD, JR.
By John Todd
Attorney Patented Oct. 23, 1951

2,572,588

UNITED STATES PATENT OFFICE 2,572,588

BLIND ASSEMBLY NUT

William A. Bedford, Jr., North Scituate, Mass., assignor to United-Carr Fastener Corporation, Cambridge, Mass., a corporation of Massachusetts Application February 20, 1947, Serial No. 729,681

5 Claims. (Cl. 151—33)

The present invention relates to nuts for screw fastenings, and particularly to nuts for blind assemblies wherein the nut member must be mounted in a supporting structure that is accessible from one side only.

In such assemblies there is usually a supporting structure provided with an aperture in which is mounted a nut member or socket member for locking engagement with a screw or stud passed through a part to be secured to the support. In blind installations only one face of the support is accessible to a workman and the nut as well as the screw must be applied to the support from the accessible side.

One of the primary objects of the invention is the provision of a nut member for blind installations that may be readily secured to an apertured support by a turning movement applied from an accessible side, and which will present a male fastener locking portion spaced rearwardly of and securely attached to the apertured support.

A further object of the invention is the provision of a simple inexpensive nut member for blind assemblies that may be made from a single piece of sheet metal.

Other aims and objects of the invention will be apparent to persons skilled in the art to which the invention relates from a consideration of the accompanying drawings and annexed specification, illustrating and describing two preferred embodiments of the invention.

In the drawings

Fig. 1 is a rear face elevation as viewed from the inaccessible face of a support and illustrating a blind installation embodying a nut member according to one form of the invention;

Fig. 2 is a front elevation of the installation shown in Fig. 1 as viewed from the accessible face of the support;

Fig. 3 is a central sectional view of the installation as taken on line 3—3 of Fig. 1;

Fig. 4 is a transverse sectional view of the nut and apertured support as taken on the line 4—4 of Fig. 1;

Fig. 5 is a transverse sectional view of the nut and apertured support as taken on the line 5—5 of Fig. 1;

Fig. 6 is a top plan view of the nut shown in Fig. 1;

Fig. 7 is a side elevation of the nut shown in Fig. 6;

Fig. 8 is an end elevation of the nut shown in Figs. 6 and 7;

Fig. 9 is a detail perspective view of the nut shown in Figs. 6, 7 and 8, as viewed from the inner side;

Fig. 10 is a perspective view of the nut shown in Figs. 6 to 9 as viewed from the outer side; and Fig. 11 is a detail perspective view of a slightly modified form of nut.

Referring to the drawings, the fastener member 10 is adapted to be attached to a supporting part 1 of a blind installation by being inserted in an elongated aperture 2 from an accessible face 1ª and thereafter locked to the supporting part by rotating the fastener 10 ninety degrees. As herein illustrated, the aperture 2 is rectangular in shape though it will be obvious that it may be of other elongated shape.

The fastener member 10 comprises a body portion 11 apertured as at 12 to receive a male fastener member. As herein disclosed, the male fastener member may be a screw 4 and the apertured body therefor is threaded to engage the threads of the screw. Such screw-engaging threads may be formed by shaping the marginal edge of the aperture 12 in the form of a helix 13 as shown in Figs. 1 to 10 inclusive, or by providing an internally threaded screw-receiving barrel on the body as will be hereinafter described in connection with Fig. 11.

The body 11 is provided along its opposite side edges with angularly disposed flanges 14 preferably normal to the body, which flanges are adapted for edge-bearing engagement with the inaccessible face of the support.

The body 11 will correspond generally in shape to the support aperature 2 being preferably of slightly less length and width so as to be freely passable through the aperture when aligned therewith.

The fastener is formed with laterally extending wings 16 extending outwardly and angularly to the flanges 14 and spaced below the support-engaging edges 15 thereof, being connected to the flanges 14 by legs 17. The depth of the legs 17 which determines the spacing between the flange support-engaging edge 15 and the wings 16 is substantially equal to the thickness of the support 1. The legs 17 are spaced inwardly from opposite ends of the body, and the legs on opposite sides of the body 11 are disposed near but spaced from opposite ends of the body. Thus the legs 17 are connecting means between the body flanges 14 and wings 16 which engage opposite sides of the support and they are preferably of less length than the width of the support aperture 2 so that the fastener may be turned 90 degrees therein.

The wings 16 are preferably of a length substantially equal to the body 11 and the wings on opposite sides are split longitudinally as at 18 from opposite ends to provide longer support-bearing portion 19 and shorter positioning legs 20. The terminal end of the longer portions 19 may be outwardly flared so as to ride readily over the accessible face 1ª of the support 1 upon turning, and the terminal ends of the shorter legs 20 may be inturned so as to be confined in the aperture 2 as is clearly shown in Figs. 1 and 2. The distance between the ends of the positioning legs 20 on opposite sides of the fastener will not be greater than the width of the aperture 2, and preferably is slightly less than said aperture width to permit slight shifting of the fastener 10 on the support in two directions to facilitate alignment of the aperture 12 with a screw 4 to be engaged thereby.

The fastener illustrated in Fig. 11 is similar to that illustrated in Figs. 1 to 10 inclusive except that the screw-engaging threads 13ª are formed on the inner wall of a tubular barrel 25 extending in a direction normal to the body 11 and which may be drawn from the body 11 so as to be a unitary integral part thereof.

If desired, the body may be provided with spaced wrench-receiving apertures 26 on opposite sides of the screw-receiving opening to facilitate rotating the fastener in the support aperture 2.

It will be observed that the fastener 10 is held in position on the support 1 by opposed engagement of the flange edges 15 with the inaccessible face and the wings 18 and 19 with the accessible face. The screw-engaging portion 13 of the fastener is spaced from the support and the fastener as a whole may be readily shifted in two directions to facilitate alignment with a screw passed through an aperture in a part 5 to be secured to the support.

Although I have illustrated and described my invention with reference to two illustrated embodiments thereof, I do not intend to be limited thereby as the scope of the invention is best defined in the appended claims.

I claim:

1. A fastener for attachment to a plate support having a substantially rectangular aperture comprising a substantially rectangular body portion corresponding generally in shape to the support aperture and being of less width and length so as to be freely passable therethrough when aligned therewith, said body portion having means for receiving a cooperating fastener element and surfaces for engaging a face of such a support when inserted through the aperture thereof and rotated about an axis normal to its plane, support-engaging wing portions disposed in a plane spaced from the plane of said surfaces and extending laterally beyond the sides of said body portion for engaging an opposite face of said support, the length of said wing portions measured lengthwise of said body portion being greater than the width of said support aperture, and means joining said wing portions to said body portion, said means comprising connecting leg portions disposed solely adjacent diagonally opposite corners of the body portion and presenting edges at the outer ends thereof for engagement with the longer edges of said support aperture when the fastener is rotated to locking position, the inner edges of said leg portions being spaced inwardly from the ends of said body portion a sufficient distance to permit free rotation of said fastener to and from locking position, said leg portions acting as stops to limit rotation of the fastener past a predetermined locking position.

2. A fastener as set forth in claim 1 including oppositely extending resilient legs connected to said wing portions and extending angularly toward opposite diagonal corners of said body portion for snap-in engagement with the longer edges of said support aperture when the fastener is rotated to locking position, said legs when so engaged preventing rotation of the fastener from locking position.

3. A fastener for attachment to a plate support having a substantially rectangular aperture comprising a substantially rectangularly shaped body portion having its width and length substantially equal to the width and length of the aperture in the support with which it is to be used, means on said body portion for receiving a cooperating fastener element, integral flanges extending from opposite side edges of said body portion substantially normal thereto and adapted for edge-bearing engagement with a face of such a support after insertion of said body portion through the aperture therein and rotation of said body portion about an axis normal to its plane, and support-engaging wing portions connected to said flanges by integral extensions thereof, said wing portions being disposed in a plane spaced from the plane of said support-engaging edges and extending laterally beyond the sides of said body portion for engaging an opposite face of said support, said wing portions being substantially equal in length to said body portion, and said extensions being less in length than the width of said support aperture.

4. A fastener as set forth in claim 3 wherein the integral connecting extensions are disposed solely adjacent diagonally opposite corners of the body portion to permit rotation of the fastener in a support-aperture to a predetermined locking position and to prevent rotation thereof beyond such a position.

5. A fastener as set forth in claim 4 wherein the wing portions are provided with oppositely extending legs disposed adjacent the diagonally opposite corners of the body portion opposite said connecting extensions, said legs being adapted to engage opposed edges of a support aperture when the fastener is rotated to locking position to prevent rotation thereof from locking position.

WILLIAM A. BEDFORD, Jr.

REFERENCES CITED

The following references are of record in the file of this patent:

UNITED STATES PATENTS

| Number | Name | Date |
|---|---|---|
| 890,285 | Krantz | June 9, 1908 |
| 1,744,488 | Mitchell | Jan. 21, 1930 |
| 1,775,042 | Le Moine | Sept. 2, 1930 |
| 1,912,100 | Rosenberg | May 30, 1933 |
| 2,273,648 | Kost | Feb. 17, 1942 |
| 2,302,389 | Kost | Nov. 17, 1942 |